UNITED STATES PATENT OFFICE.

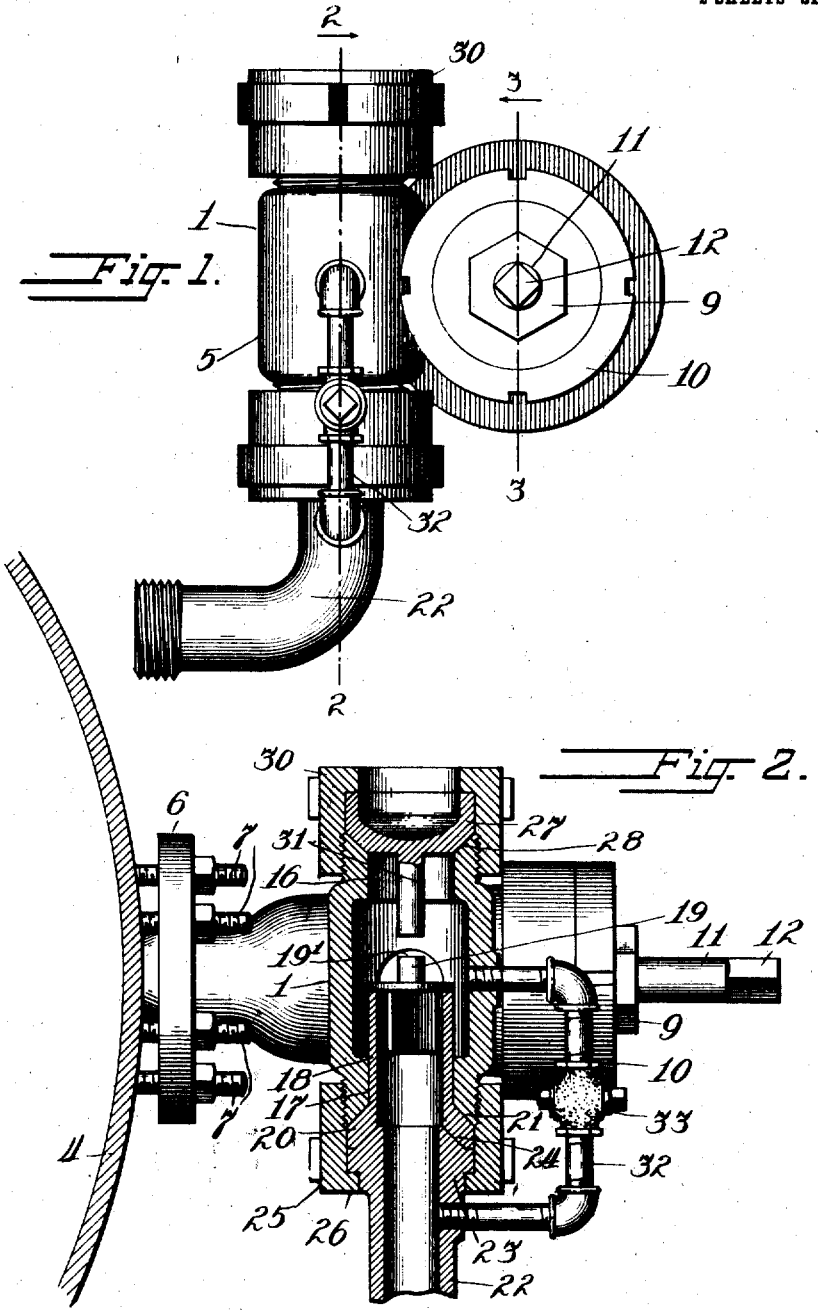

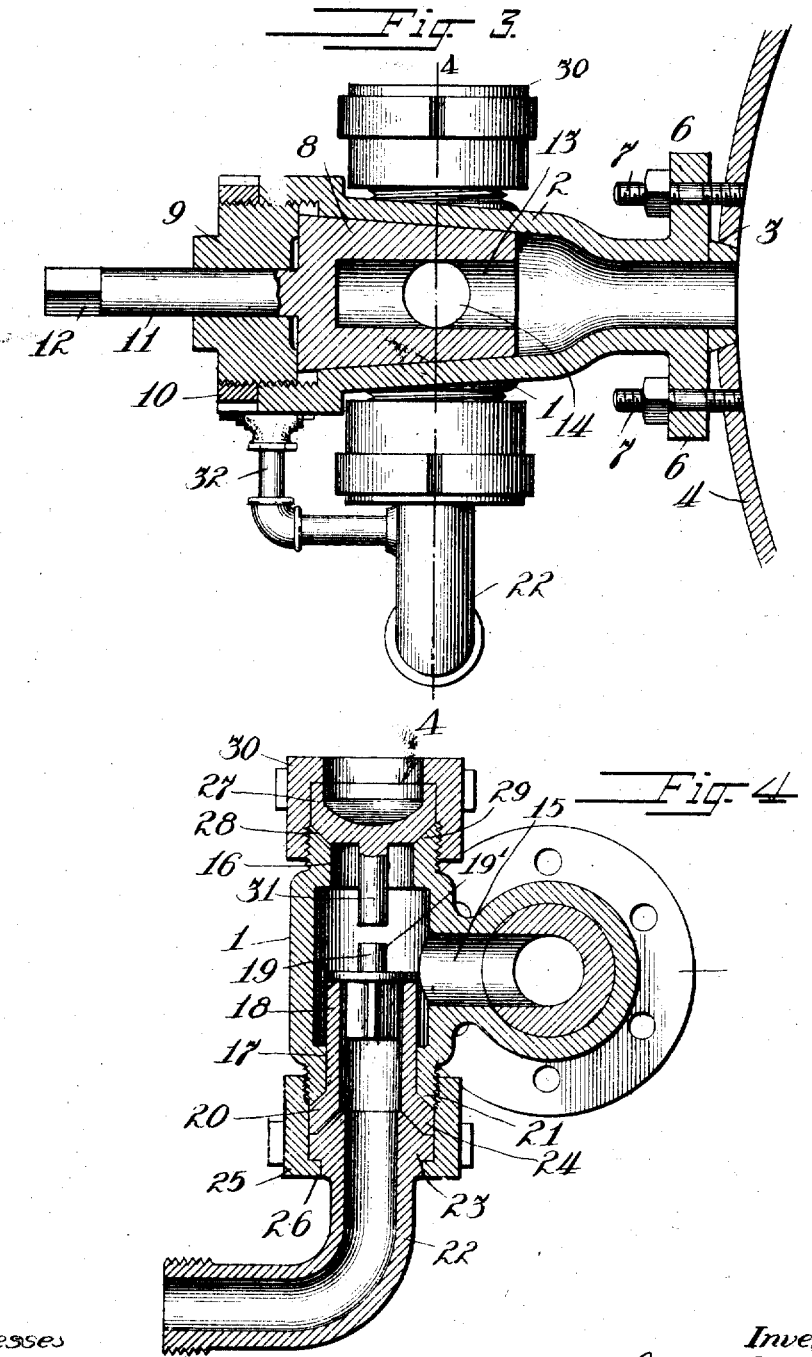

GEORGE B. EDDY, OF CHICAGO, ILLINOIS.

COMBINED CHECK AND CUT-OFF VALVE FOR LOCOMOTIVES.

No. 900,989.

Specification of Letters Patent.

Patented Oct. 13, 1908.

Application filed August 22, 1907. Serial No. 389,611.

*To all whom it may concern:*

Be it known that I, GEORGE B. EDDY, a citizen of the United States, residing at Chicago, in the county of Cook and State of Illinois, have invented certain new and useful Improvements in a Combined Check and Cut-Off Valve for Locomotives, of which the following is a specification.

This invention relates to an improved combined check and cut-off valve for locomotives, and it has for its salient objects:—to provide in a construction of the character referred to novel construction and arrangement of the turn-cock valve associated with the check valve mechanism; to provide a construction, the various parts of which are arranged in symmetrical relation and provided with transposable connections; to provide a construction in which the cut-off valve is peculiarly constructed and arranged in such manner as to effectively avoid a tendency to leak on the one hand and tendency to become stuck and immovable on the other hand; to provide a construction to so organize and construct the parts that both the check valve and the cut-off valve may be conveniently removed from the valve casing without disconnecting the latter from the boiler; to provide a construction which affords access for both cleansing and grinding to both valve seats without detaching the device from the boiler; to provide means for determining whether or not the cut-off valve be properly closed before the valve casing is opened, and, in general, to provide an improved construction in devices of the character referred to.

To the above ends the invention consists in the matters hereinafter described and more particularly pointed out in the appended claims.

The invention will be readily understood from the following description, reference being had to the accompanying drawings, in which Figure 1 is a view in elevation of a preferred embodiment of the invention; Fig. 2 is a sectional view taken approximately on line 2—2 of Fig. 1, and looking in the direction of the arrows; the by-pass pipe being, however, shown in side elevation; Fig. 3 is a sectional view taken on line 3—3 of Fig. 1, and looking in the direction of the arrows, and Fig. 4 is a sectional view taken on line 4—4 of Fig. 3.

Referring to the drawings, 1 designates, as a whole, the valve casing, comprising, as to its chief parts, a slightly tapered tubular member 2 terminating at its smaller end in a tapered nipple 3 adapted to be seated in a correspondingly shaped aperture in a boiler or other vessel under steam pressure as, for instance, a locomotive boiler, and a second approximately cylindric tubular member 5 united with the member 2 and lying substantially at right angles to the axis of the latter.

The member 2 is provided near its attached end with an annular flange 6, through which are inserted a series of attaching bolts 7 tapped into the boiler as indicated clearly in the drawing. The tapered interior of the casing member 2 is accurately formed to receive a truncated, correspondingly tapered, cut-off valve 8, and to hold the valve to its seat. The larger end of the casing 2 is threaded to receive a correspondingly threaded end-closure plug 9, the inner face of which impinges against the end of the valve body. A check ring 10 serves to lock the closure plug in adjusted position. The valve body 8 is provided with a stem 11 which extends out through the plug 9 and terminates in a spanner-formed shank 12, whereby the cut-off valve may be rotated. The cut-off valve body is axially bored or made hollow from its inner end outwardly, as indicated at 13, and with the bore 13 is arranged to communicate an intersecting bore or port 14, which is adapted by rotation of the valve body to be brought into register with the port or passage 15 leading in through the side of the casing member 2.

The interior of casing 5 is substantially cylindric and the ends of this member are slightly contracted and axially bored as indicated at 16 and 17, respectively. In the lower reduced end of the member 3 is seated a check valve sleeve 18, which, at its inner end, projects freely within the cylindric chamber and receives the check valve member 19. The outer end of this sleeve terminates in a flange 20, which is preferably, as shown, conical both exteriorly and interiorly and fits against the correspondingly beveled end seat 21 of the casing.

22 designates, as a whole, the feed pipe which communicates with the casing member 3, and in order to unite this feed pipe with the casing, the pipe is provided with an enlarged terminal head 23, the inner end or face 24 of which is conical to fit accurately within and against the end of the valve sleeve 18. A union sleeve 25 is arranged to telescope over the head 23 and is threaded upon the end of the casing 5; the outer end of this union sleeve being provided with an inturned flange 26 which engages the head of the feed pipe and serves to clamp the parts together. It will be noted that the construction of the parts is such that when the union sleeve is disengaged, the parts may be separated and the valve sleeve with its contained check valve bodily removed from the main valve casing.

The opposite end of the casing member 2 receives an end closure 27 which is provided with a conical seat 28 fitting against the correspondingly beveled end 29 of the casing and said closure is held in place by a cap nut 30 threaded upon the end of the casing and overlying the member 27. The member 27 is provided upon its inner end with a stop stud 31 which coöperates with a similar stop-stud 19' upon the check valve; the length of these studs being such as to properly limit the rising or opening movement of the check valve.

When it is proposed to remove the check valve mechanism for the purpose of inspection, cleansing or repair, the cut-off valve is, of course, turned into closed position so as to prevent pressure upon the boiler entering the check valve chamber. In order to determine definitely whether the cut-off valve is absolutely tight and in position to fully cut off the pressure, a by-pass pipe 32 is provided, one end of which communicates with the check valve chamber through the side of the casing member 5 and the other end of which communicates with the feed pipe 22. In this by-pass is provided a turn cock 33 which may be turned into either open or closed position, as usual.

The operation of the device will be obvious from the foregoing description. The device is characterized, however, in the following respects, namely, that the pressure of the boiler acts directly upon the cut-off valve body 8 in such a manner as to tend to force the latter back out of its tapered seat, from which it follows that no matter how tightly the follower plug 9 be jammed against the valve body the latter will be released and freed to rotate by slightly backing out said follower nut. This is of importance because it is very common in mechanisms of this character to have the valves which are only occasionally used become set or stuck so tightly as to be practically immovable, and failure to set the valve body tightly to its seat accentuates this trouble because it permits the deposit of scale between the seat and valve body. The construction is such that when the cut-off valve is bodily removed, as it may be by simply removing the plug 9, free access may be had to grind or dress the tapered valve seat in the valve casing. So, also, it is to be noted that the end plug 27 may be readily removed, the check valve lifted out and its seat ground, dressed or cleansed without disturbing either the connection of the device as a whole with the boiler or the connection of the feed pipe thereto. Again, if it be more convenient or desirable, the check valve sleeve 18, may be bodily removed for repair or renewal by simply disconnecting the union coupling 25. In case the limiting stops between the check valve and stem 31 require readjustment so as to shorten the lift of the check valve, this is readily accomplished by simply removing the cap 30 and dressing the bevel seat between the plug 27 and the correspondingly tapered end of the valve casing.

It is particularly noted that each end of the casing member 5 and the outer larger end of the casing member 2 are so arranged as to afford free access of dressing tools without disturbing the connection of the device with the boiler. Moreover, it will be noted that the two ends of the casing member 5 are identical in construction and symmetrically disposed with relation to the casing member 2 and contained parts, so that the feed pipe may be transposed and connected with the opposite end of the casing member 5. Moreover, the by-pass 32 has one of its legs connected with the center of the length of the casing member 5, so that it also permits of transposition with the feed pipe. The reversibility of connections thus provided for is of considerable importance for the reason that it reduces the stock of supplies necessary to be carried by the locomotive repair shops practically one-half, since it is only necessary to carry in stock one form of the device instead of rights and lefts as has heretofore been customary.

While I have shown and described what I deem to be the preferred embodiment of my invention, yet the construction may be somewhat modified without departing from the spirit of the invention.

I claim as my invention:

1. In a cut-off valve mechanism for locomotive boilers and the like, a valve casing member having its sides interiorly tapered to form a valve seat converging toward the delivery end of the casing, and provided with a removable closure affording access to the larger end of said tapered seat and of the full size of the largest part of the latter, means for attaching the smaller end of said valve casing to a boiler or other vessel under pressure, a check valve chamber connected to and communicating with the side of said first mentioned valve casing, an elongated, conical, turn-cock valve seated in said valve casing and adjustably held against axial movement by the end closure of said valve casing, said turn-cock valve being provided with a passage entering its smaller end and extending out through a port in its side, adapted to be rotated into and out of register with said check valve casing, a check valve operatively mounted in said check valve chamber, and a feed pipe connected with the latter chamber and delivering thereto through said check valve.

2. In a device of the character described, an elongated tubular valve casing member having its interior tapered conically to form a valve seat which converges toward the delivery end of the chamber, a turn-cock valve fitted within said tapered seat, an end closure removably threaded upon the end of said casing, of a diameter equal to the largest part of said turn-cock valve and adjustably impinging upon the latter to hold it to its seat against pressure, a tubular check valve casing member having its opposite ends of similar construction, secured at right angles and in symmetrical relation to the side of said first mentioned valve casing member, a port being arranged to extend through the connecting wall between the two valve casing members, a check valve sleeve removably inserted in one end of said check valve casing member, a check valve associated with the inner end of said sleeve, a feed pipe detachably connected with one end of said check-valve casing and a removable end closure for the opposite end of said check valve casing, said feed pipe and check valve sleeve and the securing member therefor being transposable with the opposite end closure.

3. In a device of the character described, an elongated tubular valve casing member having its interior tapered conically to form a valve seat which converges toward the delivery end of the chamber, a turn-cock valve fitted within said tapered seat, an end closure removably threaded upon the end of said casing, of a diameter equal to the largest part of said turn-cock valve and adjustably impinging upon the latter to hold it to its seat against pressure, a tubular check valve casing member having its opposite ends of similar construction, secured at right angles and in symmetrical relation to the side of said first mentioned valve casing member, a port being arranged to extend through the connecting wall between the two valve casing members, a check valve sleeve removably inserted in one end of said check valve casing member, a check valve associated with the inner end of said sleeve, a feed pipe detachably connected with one end of said check-valve casing, a removable end closure for the opposite end of said check valve casing, said feed pipe and check valve sleeve and the securing member therefor being transposable with the opposite end closure, and a by-pass pipe having one end communicating with the check valve chamber, its opposite end communicating with the feed pipe and provided between its ends with a turn-cock, one leg of said by-pass being connected with the middle of the check valve casing so that its opposite end is transposable with the feed pipe connections.

GEORGE B. EDDY.

Witnesses:
ALBERT H. GRAVES,
FRANK L. BELKNAP.